United States Patent [19]

Fujimoto et al.

[11] 3,819,588

[45] June 25, 1974

[54] PROCESS FOR SAPONIFYING POLYPEPTIDES CONTAINING A UNIT OF GLUTAMIC ACID-GAMMA-ESTER USING A MIXTURE OF ALCOHOLS IN THE PRESENCE OF AN ALKALINE METAL HYDROXIDE

[76] Inventors: Yasuo Fujimoto, 1177-4 Ichigacho, Midori-Ku, Tokyohama; Yoichi Koiwa, 5-16-14, Hatanodai, Tokyo, both of Japan

[22] Filed: Aug. 28, 1972

[21] Appl. No.: 284,134

[30] Foreign Application Priority Data
Sept. 6, 1971   Japan................................. 46-68110

[52] U.S. Cl............................................. 260/78 A
[51] Int. Cl............................................. C08g 20/06
[58] Field of Search.................................... 260/78 A

[56] References Cited
OTHER PUBLICATIONS

J. Chem. Soc., 1950, Hanby et al. – pp. 3,239–3,249.
J. Biol. Chem. 197, pp. 771–782, Green et al. 1952.
Chem. Abstracts, Vol. 69, 1968, 36729h, Takagi et al.

Primary Examiner—Howard E. Schain
Attorney, Agent, or Firm—Fitzpatrick, Cella, Harper & Scinto

[57] ABSTRACT

A process for preparing a polypeptide or copolypeptide having a high molecular weight and a narrow molecular weight distribution and containing a unit of an alkali metal salt of glutamic acid is provided. The polypeptide or copolypeptide is prepared by saponifying a polypeptide or copolypeptide having a unit of a $\gamma$-ester of glutamic acid within the molecule with an alkali metal hydroxide.

10 Claims, 3 Drawing Figures

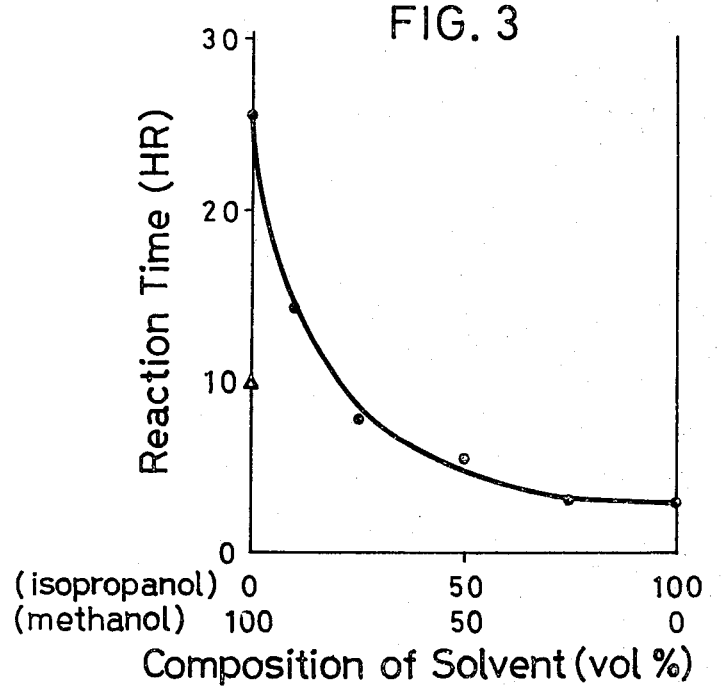

PROCESS FOR SAPONIFYING POLYPEPTIDES CONTAINING A UNIT OF GLUTAMIC ACID-GAMMA-ESTER USING A MIXTURE OF ALCOHOLS IN THE PRESENCE OF AN ALKALINE METAL HYDROXIDE

This invention relates to a process for preparing on an industrial scale a polypeptide or copolypeptide having a high molecular weight and a narrow molecular weight distribution and containing a unit of an alkali metal salt of glutamic acid. The polypeptide or copolypeptide is prepared by saponifying a polypeptide or a copolypeptide having a unit of a γ-ester of glutamic acid within the molecule with an alkali metal hydroxide.

Recently, increasing attention has been paid to polyamino acids, and research has been actively pursued in the areas of synthesis, physical properties and industrial utilization of these acids. The industrial utilization of polyglutamic acid has been advanced steadily because the production cost of raw glutamic acid has been lowered to the level of that of industrial raw materials. In addition, research on polyglutamic acid fibers has been advanced, thus creating a need for an industrial scale process for producing alkali metal salts of polyglutamic acid which are raw materials for the fibers.

A process for debenzylization of poly-γ-benzyl-L-glutamate has been described by M. Idelson and E. R. Blout [J. Am. Chem. Soc, 80 4631 (1958)] and has been widely carried out heretofore on a laboratory scale, but the process can not be considered to be industrially advantageous since it requires the use of hydrogen bromide. A method for the preparation of alkali metal salts of polyglutamic acid by alkali saponification of poly-γ-ethyl-L-glutamate has been reported by Stahmann et al, [J. Biol. Chem. 197 771 (1952)]. According to their method, saponification of the first stage is carried out with potassium hydroxide dissolved in alcohol and, subsequently, further saponification is continued after the addition of the same amount of water; thereafter, the reaction solution is acidified to obtain the desired product. However, the method is complicated in its operation, and it is recognized that the molecular weight of the product is affected considerably by the reaction conditions. In addition to these methods based on saponification, a method based on reduction is known, but it is industrially very disadvantageous.

Thus, it appears that a process based on the isolation of a polypeptide having a glutamic acid-γ-ester unit within the molecular (hereinafter referred to as a "polypeptide") and the subsequent suspension of the polypeptide in an alcohol-water system containing an alkali hydroxide (Oya et al. Abstracts of Lectures at Autumn Meeting for 1970 by The Society of Textile and Cellulose Industry, Japan) is the simplest of the industrially useful processes. However, the polypeptide is usually obtained in solution with an organic solvent such as a halogenated hydrocarbon, and in order to isolate the polypeptide from solution, a procedure must be followed which requires pouring the solution into a large amount of poor solvents such as alcohols, ethers, etc. in order to effect precipitation. Thus, the process wherein a solution of the polypeptide is poured into a large volume of alcohol while vigorously stirring the mixture with a mixer to obtain the precipitates, or a similar process is employed on a laboratory scale. However, it is difficult to scale up the process for the preparation of large quantities. Further, the process wherein water and an alcohol containing an alkali hydroxide are added directly to the polypeptide solution with stirring, is also known (Japanese Pat. Publication No. 4878/68). However, in the latter process, it is necessary to add a surfactant to the solution. The prevention of any decrease in the degree of polymerization and reduction of the saponification time can be effectively brought about thereby. However, in said process, it is necessary to remove the added surfactant from the final product. If the surfactant remains in the product, it has an undesirable effect on the quality of the fibers obtained when a polypeptide is used as the raw material for fibers. In addition, the residual surfactant must be completely removed in some cases, depending upon the intended use of the product. Thus, it is most desirable to carry out saponification without resorting to the use of a surfactant.

When saponification is carried out with an alkali metal hydroxide in the presence of n-propanol, i-propanol, n-butanol, i-butanol, sec-butanol, t-butanol or alcohols having longer carbon chains, the product is obtained as a sticky or gummy precipitate, irrespective of the addition of a surfactant. Thus, the precipitate sticks to the inner wall of the reaction vessel making it difficult to remove it. In practice, the foregoing procedure cannot be carried out on an industrial scale. Another disadvantage is that considerable reduction of the molecular weight takes place in this process.

On the other hand, even when saponification is carried out with an alkali hydroxide in the presence of methanol or ethanol, partially saponified products are deposited in granular form (the granules become finer when a surfactant is added to the mixture) in the initial stage of the reaction, irrespective of the addition of the surfactant, and the reaction proceeds in the form of a solid-liquid reaction mixture for the remainder of the saponification. Therefore, saponification proceeds with difficulty inside the partially saponified product (at the core) such that considerable time is required before the reaction goes to completion. Consequently, the frequencies of ruptures of main chains of the polypeptide near the surfaces of the deposits are increased: this is the cause of the low degree of polymerization, the broad molecular weight distribution of the product, etc. These trends are particularly noticeable when methanol is used as the solvent.

The present inventors have found that, when a mixture of certain alcohols, obtained by mixing, in a given ratio, methanol or ethanol (these being referred to as "group I") with an aliphatic alcohol having 3–10 carbon atoms or an aralkyl alcohol having 7–9 carbon atoms such as, for example, n-propanol, i-propanol, n-butanol, i-butanol, sec-butanol, tert-butanol, n-pentanol, 2-methyl-1-butanol, 3-methyl-1-butanol, 2-pentanol, 3-pentanol, tert-pentanol, fusel oil, n-hexanol, 4-methyl-2-pentanol, 2-ethyl-1-butanol, 2-heptanol, 3-heptanol, n-octanol, 2-octanol, 2-ethylhexanol, 2-ethyl-3-pentanol, 3,5,5-trimethylhexanol, n-decanol, methylphenylcarbinol, ethylphenylcarbinol or benzyl alcohol (these being referred to as "group II"), a finely powdered final product is obtained which has a considerably high molecular weight and a narrow molecular weight distribution and can be handled easily when compared with products obtained where a single alcohol is employed; in addition, the reaction time can be shortened thereby. The polypeptides which maybe employed in the present invention may be either optically active or inactive, irrespective of the optical purity. Further, when the polypeptides contain a unit such as an aspartic acid-$\beta$-ester, which undergoes the same saponification as the glutamic acid-$\gamma$-ester, these esters will also undergo hydrolysis.

DESCRIPTION OF THE PREFERRED EMBODIMENTS

According to the process of the present invention, water and alkali metal hydroxide are added with stirring to a solution of a polymerized polypeptide or a solution prepared by dissolving an isolated polypeptide in a solvent. Suitable solvents for the polypeptide include alyphatic hydrocarbons such as methyl chloride, dichloroethane, trichloroethane, nitriles such as acetonitrile, ethers such as tetrahydrofuran, aromatic hydrocarbons such as benzene, esters such as ethyl acetate and ketones such as methylethylketone. The process is carried out by adding to the polypeptide solution a mixture of alcohols consisting of one or both members of the alcohols of group (I) and at least one member of the alcohols of group (II), the alcohols of group (I) comprising 5–90 percent of the mixture. Whether the alcohols are added to the solution after mixing or are added thereto in succession, the result is substantially the same. The concentration of the polypeptide in the solution before the addition of alcohol mixture is not limited, but it is usually preferred to use a concentration of 1 to 30 percent by weight. In addition, it is preferred that the total amount of alcohols to be used be 0.5 to 5 times as much as the volume of the polypeptide solution and that the volume of the water be 5–50 percent as much as the volume of the alcohol. It is possible to change the ratios of the alcohol and water to that of the polymer solution according to the viscosity of the polypeptide solution, the molecular weight thereof, the kind of the solvent employed, etc. As the alkali metal hydroxide, any of the hydroxides of potassium, sodium, lithium, etc. may be employed. It is preferred to use molar ratios of about 1.2 to 1.4 times as much as the unit of glutamic acid-$\gamma$-ester in the polypeptide. The reaction can be carried out at a temperature of 0° – 100° C, but usually the reaction is carried out at about room temperature.

The effect of the use of the mixed alcohol solution in a given composition ratio upon the degree of polymerization, the molecular weight distribution and the reaction time in the case where a 1,2-dichloroethane solution containing 10 percent by weight of the poly-$\gamma$-methyl ester of L-glutamic acid (hereinafter referred to as "PMLG") having a degree of polymerization of 2,500 is saponified according to the present process, is shown in FIGS. 1, 2 and 3. FIG. 1 shows the effect of the alcohol composition upon the degree of polymerization. In FIG. 1, the mark "□" illustrates the case where 100 percent ethanol is employed.

In FIG. 2, the mark "O" illustrates the case where 100 percent ethanol is employed.

FIG. 3 shows an effect of the alcohol composition upon a time required for the saponification. In FIG. 3, the mark "$\Delta$" shows the case of 100 percent ethanol.

Figure 1:
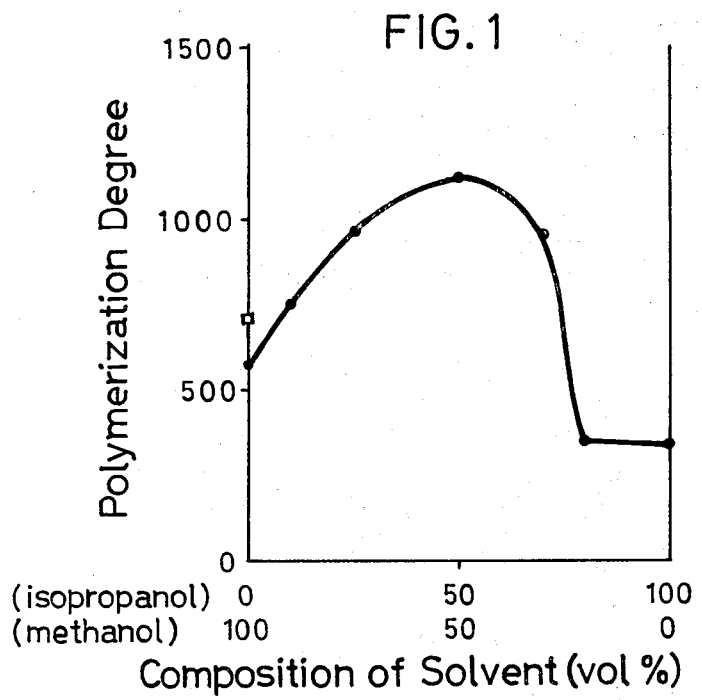
Figure 2:
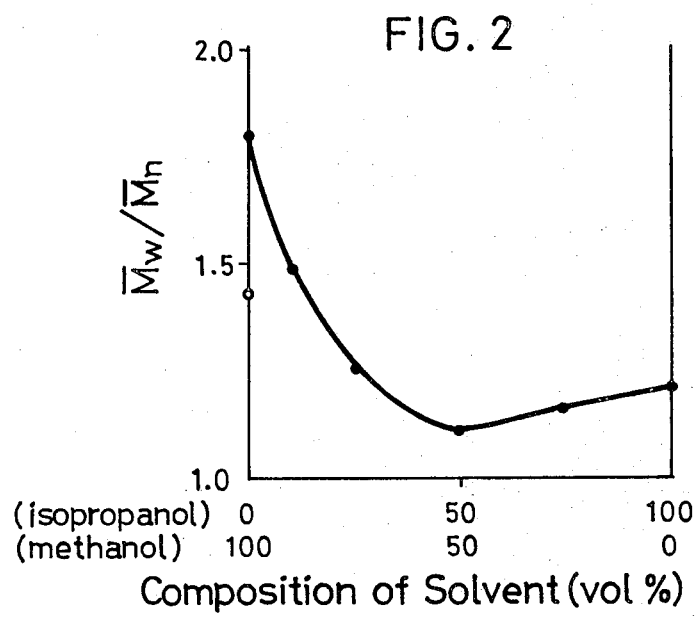
FIG. 2 shows the effect of the alcohol composition upon the breadth of the molecular weight distribution ($\overline{M}w/\overline{M}n$).

The saponification conditions are such that a volume of alcohol 1.6 times the volume of the PMLG solution is used, the volume of water is 0.25 times the volume of the alcohol, and as the alkali metal hydroxide, sodium hydroxide is employed in the molar ratio of 1.3 times the amount of glutamic acid-$\gamma$-ester of the polypeptide. As the alcohol, methanol (group I) and isopropanol (group II) are mixed together in a ratio of 1:1. The reaction temperature is 20° C. The result obtained in the case where only ethanol is employed in place of the mixture of alcohols is also shown in the Figures. A comparison of the Figures indicates that the present process is advantageous over the known process described in Japanese Pat. Publication No. 4878/68.

It is not always necessary in the present invention to mix in advance the alcohols, water and alkali metal hydroxide, and then add the resulting mixture to the solution of the polypeptide. It is also possible to add the alcohol or a mixture of alcohols and water to the solution in advance, and then add to the solution the alkali metal hydroxide dissolved in water, alcohol or a mixture thereof.

In the present invention, any kind of polyglutamic acid-$\gamma$-esters may be employed including aliphatic esters alicyclic esters and aromatic esters. Examples of suitable esters are methyl, ethyl, n-propyl, isopropyl, n-butyl, isobutyl, pentyl, hexyl, heptyl, octyl, cyclohexyl, cyclopentyl and benzyl esters.

Now the invention will be further explained, referring to the following examples, but these examples are merely illustrative and do not restrict the scope of the present invention.

In the present specification, "degree of polymerization" is measured by a method based on osmotic pressure or a method of A. Wada et al. [Mol. Phys. 3, 409 (1960)]. Also in the present specification, "saponification yield" is measured by an infra-red absorption spectrum and an elementary analysis.

EXAMPLE 1

A mixture comprising 60 cc of methanol, 20 cc of ethanol, 70 cc of isobutanol, 40 cc of water and 3.64 g of NaOH is added to 100 cc of a 1,2-dichloroethane solution containing 10 g of the poly-$\gamma$-methyl ester of L-glutamic acid (the degree of polymerization is 2,500) with stirring, and the resulting mixture is stirred at 20° C. As the reaction proceeds, the white, powdery precipitate is deposited. After 10 hours, the precipitate is filtered off with a glass filter, washed with methanol and dried. Upon drying, a product having a degree of polymerization of 1,350 and a saponification yield of 99 percent is obtained.

EXAMPLE 2

A mixture comprising 70 cc of methanol, 35 cc of isobutanol, 35 cc of n-propanol, 50 cc of water and 5.10 g of potassium hydroxide is added with stirring to 100 cc of a methylene chloride solution containing 10 g of the poly-$\gamma$-methyl ester of D-glutamic acid (the degree of polymerization is 2,500), and the resulting solution is stirred at 20° C. An emulsion forms in the reaction mixture after which fine, white crystals are deposited. The stirring is continued for 10 hours, after which the deposited material is filtered off and dried. Upon drying, a product having a degree of polymerization of 1,300 and a saponification yield of 98 percent is obtained.

EXAMPLE 3

A mixture comprising 70 cc of methanol, 35 cc of n-butanol, 35 cc of n-pentanol, 50 cc of water and 5.10 g of potassium hydroxide is added with stirring to 100 cc of a methylene chloride solution containing 10 g of the poly-γ-ethyl ester of L-glutamic acid (the degree of polymerization is 2,200). Saponification is carried out at 15° C. and white, powdery crystals are obtained. The crystals are filtered off and dried. Upon drying, a crystalline material having a degree of polymerization of 1,200 and a saponification yield of 98 percent is obtained.

EXAMPLE 4

A mixture comprising 60 cc of methanol, 20 cc of ethanol, 70 cc of isobutanol, 40 cc of water and 3.64 g of NaOH is added with stirring to 100 cc of a 1,2-dichloroethane solution containing 10 g. of a copolymer of the γ-ethyl ester of D-glutamic acid and the γ-methyl ester of D-aspartic acid in a 1:1 ratio (The copolymer has a degree of polymerization of 1,600.). The resulting mixture is stirred at 20° C. As the reaction proceeds, a white, powdery precipitate is deposited. After 10 hours, the precipitate is filtered off with a glass filter, washed with methanol and dried. Upon drying, a product having a degree of polymerization of 800 and a saponification yield of 98 percent is obtained.

EXAMPLE 5

A mixture comprising 80 cc of methanol, 80 cc of propanol, 40 cc of water and 1.85 g of NaOH is added with stirring to 100 cc of a methylene chloride solution containing 10 g of a copolymer of the γ-methyl ester of L-glutamic acid and L-alanine (in a ratio of 3:1; the degree of polymerization is 1,300). The stirring is continued for 12 hours after which the resulting deposits are filtered off with a glass filter and washed with methanol. Upon drying, a white powder having a degree of polymerization of 550 and a saponification yield of 99 percent is obtained.

EXAMPLE 6

A mixture made up of 100 cc of methanol, 40 cc of benzyl alcohol, 40 cc of water and 3.64 g of NaOH is added with stirring to 100 cc of a 1,2-dichloroethane solution containing 10 g of the poly-γ-methyl ester of L-glutamic acid (the degree of polymerization is 2,300). The reaction mixture is stirred at 18° C. As the reaction proceeds, a white, powdery precipitate is deposited. After 8 hours, the deposited material is separated by filtration, washed thoroughly with methanol and dried. Upon drying, a product having a degree of polymerization of 1,300 and a saponification yield of 97 percent is obtained.

EXAMPLE 7

A mixture made up of 60 cc of methanol, 20 cc of ethanol, 70 cc of isobutanol, 40 cc of water and 3.64 g of NaOH is added with stirring to 100 cc of a methylene chloride solution containing 10 g of the poly-γ-ethyl ester of L-glutamic acid (the degree of polymerization is 2,000). The reaction mixture is stirred at 20° C. As the reaction proceeds, a white, powdery precipitate is deposited. After 10 hours, the precipitate is filtered off, washed and dried. Upon drying, a product having a degree of polymerization of 980 and a saponification yield of 98 percent is obtained.

What is claimed is

1. In the process for saponifying a polypeptide or copolypeptide having a glutamic acid-γ-ester unit, with an alkali metal hydroxide in the presence of an alcohol, the improvement which comprises saponifying the polypeptide or copolypeptide in the presence of an alcoholic solution comprising 5–90 percent by volume of (a) one or more alcohols selected from methanol and ethanol with the remainder being (b) one or more alcohols selected from aliphatic alcohols having 3–10 carbon atoms and aralkyl alcohols having 7–9 carbon atoms.

2. The process of claim 1 wherein the alkali metal hydroxide is sodium hydroxide.

3. The process of claim 1 wherein (a) is methanol and ethanol and (b) is isobutanol.

4. The process of claim 1 wherein (a) is methanol and (b) is isobutanol and n-propanol.

5. The process of claim 1 wherein (a) is methanol and (b) is n-pentanol.

6. The process of claim 1 wherein the ester unit is selected from aliphatic esters, alicyclic esters and aromatic esters.

7. The process of claim 6 wherein the glutamic acid-γ-ester unit is a poly-γ-methyl ester.

8. The process of claim 6 wherein the ester unit is a copolymer of the γ-ethyl ester of glutamic acid and the γ-methyl ester of aspartic acid.

9. The process of claim 6 wherein the ester unit is a copolymer of the γ-methyl ester of glutamic acid and alanine.

10. The process of claim 6 wherein the ester unit is a poly-γ-ethyl ester of glutamic acid.

* * * * *